United States Patent
Vine

(10) Patent No.: US 6,176,797 B1
(45) Date of Patent: Jan. 23, 2001

(54) ADAPTOR FOR POWER TRANSMISSION IN A PULLEY AND SHAFT

(75) Inventor: Jeffery A. Vine, Beaverton, OR (US)

(73) Assignee: Poly Hi Solidur, Inc., Ft. Wayne, IN (US)

(*) Notice: Under 35 U.S.C. 154(b), the term of this patent shall be extended for 0 days.

(21) Appl. No.: 09/287,400

(22) Filed: Apr. 6, 1999

(51) Int. Cl.[7] .................................................. F16H 55/36
(52) U.S. Cl. ............................................. 474/95; 474/170
(58) Field of Search ............................... 474/95, 96, 97, 474/98, 99, 902, 903, 170

(56) References Cited

U.S. PATENT DOCUMENTS

| | | |
|---|---|---|
| 1,303,445 | 5/1919 | Wright . |
| 2,269,821 | 1/1942 | Kemphert et al. .................. 74/230.1 |
| 2,704,793 | 3/1955 | Hanson ..................................... 191/1 |
| 2,784,606 | 3/1957 | Schilling .............................. 74/230.3 |
| 2,806,379 | 9/1957 | Haracz ................................. 74/230.3 |
| 3,651,705 | 3/1972 | Bertinetti et al. .................. 74/243 R |
| 4,229,117 | 10/1980 | Coppin et al. ........................ 474/902 |
| 4,413,981 | 11/1983 | White et al. ........................... 474/94 |
| 5,061,225 | 10/1991 | Draebel .................................. 474/95 |
| 5,304,101 | 4/1994 | Baer ..................................... 474/170 |

Primary Examiner—David Fenstermacher

(57) ABSTRACT

An adaptor for power transmission in a pulley and shaft. Two adaptor portions are disposed on opposite sides of the pulley and drawn axially together to capture the pulley therebetween. At least one of the adaptor portions is attached to a quick disconnect bushing on the shaft. A connecting member is tightened to draw the adaptor portions and the bushing together. Preferably, the bushing is tapered and the adaptor portions are correspondingly tapered, providing a radially directed force. The adaptor portions are particularly suited for use with a pulley that is substantially formed of plastic.

9 Claims, 2 Drawing Sheets

ADAPTOR FOR POWER TRANSMISSION IN A PULLEY AND SHAFT

BACKGROUND OF THE INVENTION

This invention relates to an adaptor for power transmission in a pulley and shaft which is particularly advantageous for adapting a plastic pulley for attachment to a metal shaft for the transmission of power at high torque.

Typically, chain driven pulleys for power transmission are formed of metal and are keyed directly to metal shafts. Alternatively, they may be attached to tapered bushings, also formed of metal, that include a cylindrical aperture and a keyway for connection to the shaft. The tapered bushings have a slightly tapered frustrum that is slit axially along a side to allow the frustrum to compressibly form a strong interference fit with a hole through the pulley. The pulley is further held to the tapered bushing by bolting the pulley to threaded holes in a corresponding flange of the bushing.

Although such metal pulley and shaft systems are well suited to transmitting power at high torque, such systems have well known disadvantages in that they are relatively costly, have heavy rotating parts, can be noisy, and are susceptible to corrosion. For this reason, power transmission components made from plastic are also available. Such components provide for less cost, weight and noise, and greater corrosion resistance; however, they are less able to transmit power at high torque. Where keyed directly to a shaft, the plastic deforms at the keyway under large loads. Moreover, plastic pulleys typically cannot be reliably attached to tapered bushings, because they cannot compress the frustrum sufficiently to form a strong interference fit.

Generally, it is advantageous to provide a pulley and adaptor profile that serves as a guide as well as provides friction surfaces for transmitting torque, as suggested by Draebel, U.S. Pat. No. 5,061,225. A disadvantage of the trapezoidal profiles of Draebal, however, is that such complex profiles are non-standard features in typical pulleys.

Accordingly, there is a need for an adaptor for power transmission in a pulley and shaft that provides for the advantages of light weight, low cost and low acoustical noise available from plastic pulleys and provides for high torque power transmission.

SUMMARY OF THE INVENTION

The present invention solves the aforementioned problems and meets the aforementioned needs by providing an adaptor for power transmission in a pulley and shaft comprising two adaptor portions. The adaptor portions are disposed on opposite sides of the pulley and drawn axially together to capture the pulley therebetween. At least one of the adaptor portions is attached to a bushing which is attached to the shaft. A connecting member passes through the bushing and the adaptor portions and tightening of the connecting member draws both adaptor portions and the bushing together. Preferably, the bushing is tapered and the adaptor portions are correspondingly tapered, so that drawing both adaptor portions and the bushing together forces sides of the adaptor portions against a side of the bushing. Preferably, the adaptor portions are employed with a pulley that is substantially formed of plastic, and that has a standard configuration, such as having substantially parallel faces and a substantially perpendicularly extending central aperture.

Accordingly, it is a principal object of the present invention to provide a novel adaptor for power transmission in a pulley and shaft.

It is another object of the present invention to provide such an adaptor that provides for light weight, low cost and low acoustical noise.

It is still another object of the present invention to provide such an adaptor that provides for high torque power transmission.

It is yet another object of the present invention to provide such an adaptor for use with a pulley having a standard configuration.

The foregoing and other objects, features and advantages of the invention will be more readily understood upon consideration of the following detailed description of the invention, taken in conjunction with the following drawings.

DETAILED DESCRIPTION OF THE PREFERRED EMBODIMENT

Figure 1:
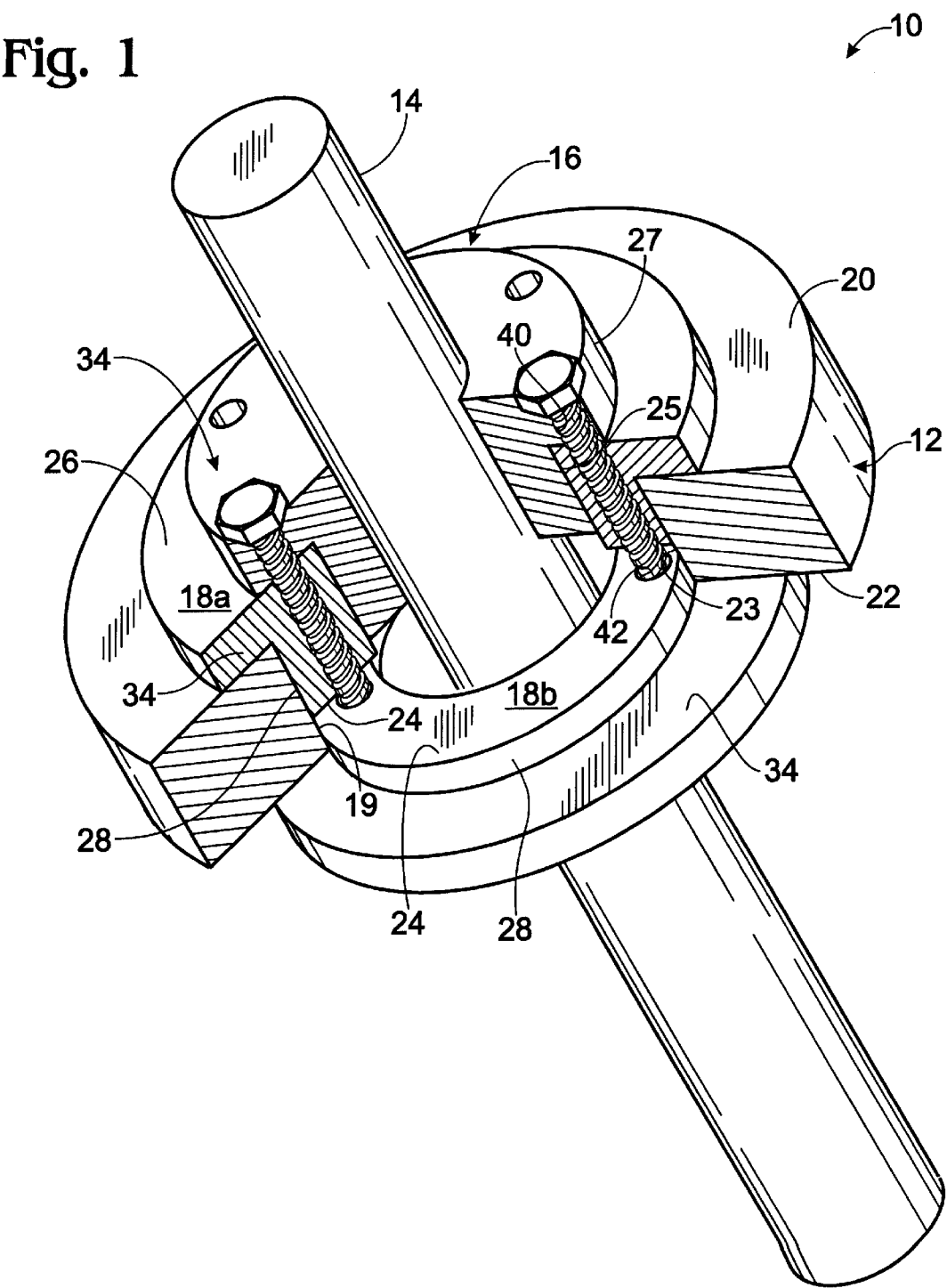
FIG. 1 is a pictorial view of an adaptor for power transmission in a pulley and shaft according to the present invention.
Figure 2:
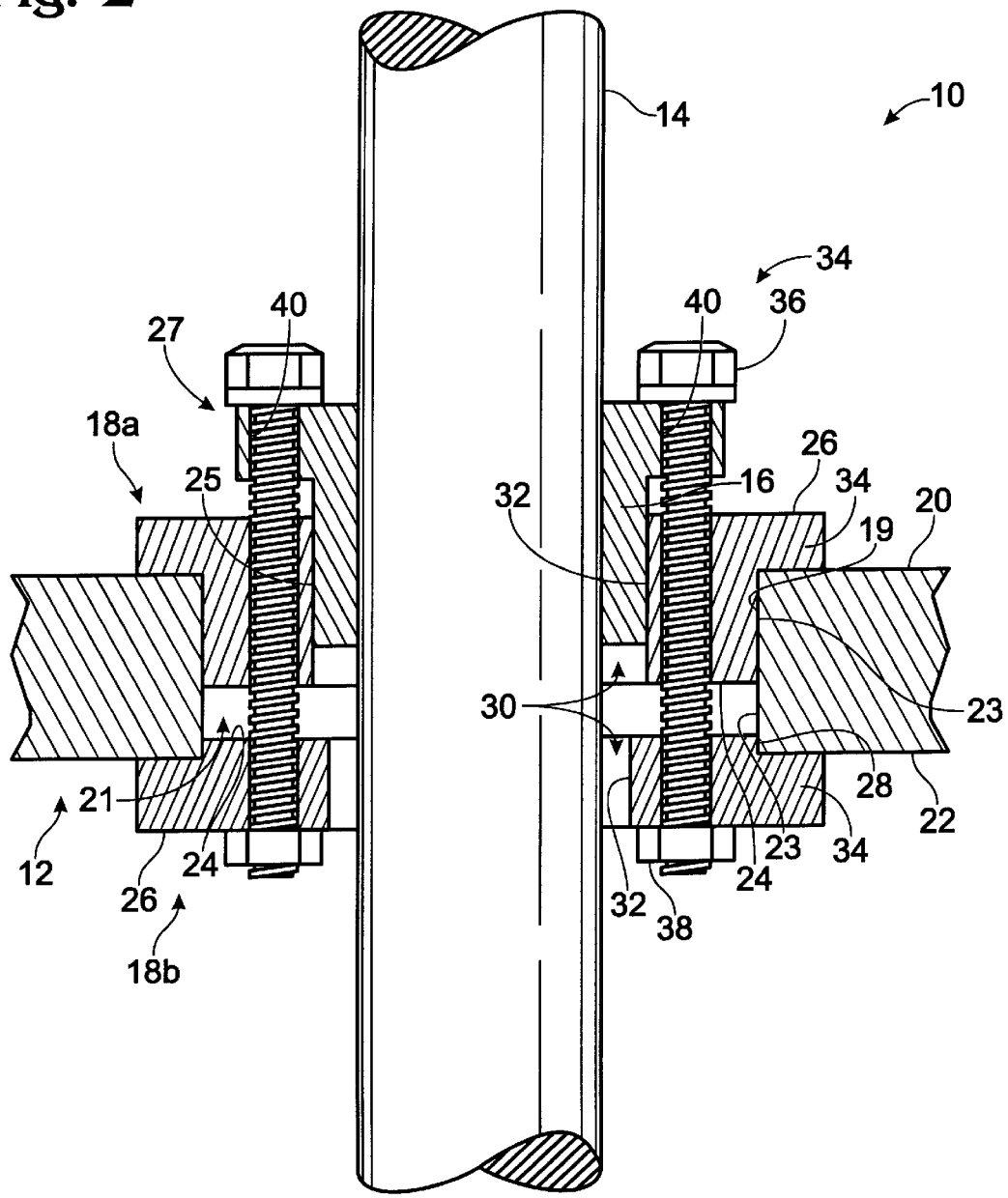
FIG. 2 is a cross-sectional view of the adaptor of FIG. 1.

An adaptor 10 according to the present invention for power transmission in a pulley 12 and shaft 14 is shown in FIGS. 1 and 2. For purposes herein, the term "pulley" is intended generally to mean a member that is attachable, either directly or indirectly, to a rotatable shaft and which is adapted to provide a moment arm about the shaft. The pulley may be a gear, sprocket, sheave or wheel, or it may have some other form or configuration and need not be radially symmetric.

It has been past practice to attach the pulley either directly to the shaft, via a key and keyway for example, or to attach the pulley to a bushing that is itself attached to the shaft. As aforementioned, a particularly advantageous and common type of bushing is a tapered bushing, such as that marketed by Emerson Power Transmission Corp., of Maysville Ky. as the QD bushing, shown as 16. The adaptor 10 takes advantage of the tapered bushing; however, the invention is not limited thereto or to the use of bushings generally. One of ordinary skill in the art will be able to modify the adaptor 10 for direct attachment to the shaft, such as by keying, or for attachment to other intermediate structures as required.

The adaptor 10 provides particular advantages when the pulley 12 is formed of plastic, so that transmission of power at high torque is typically difficult or impossible due to the relative weakness of the plastic as compared to the shaft. However, the invention is not limited to use with pulleys or shafts formed of particular materials or having particular mechanical characteristics.

The pulley 12 has a top face 20, a bottom face 22, and a central aperture 21 through the pulley that defines an interior side surface 23 thereof. The tapered bushing 16 has an exterior side surface 25 and a flange 27 extending radially beyond the exterior side surface 25. The tapered bushing may be attached to the shaft 14 in any known manner.

The adaptor comprises two adaptor portions 18a and 18b which are pictured generally in FIGS. 1 and 2 but which may, for purposes of economy of manufacture, be identical. Preferably, the adaptor portions are formed of metal and provide for at least most of the advantages of employing a plastic pulley when transmitting high torque loads. However, the adaptor portions may also be formed of a lightweight material, including plastic, without departing from the principles of the invention.

The two adaptor portions correspond respectively to the top face 20 and the bottom face 22 of the pulley 12. Each adaptor portion has opposite faces 24 and 26, an exterior side surface 28 and a central aperture 30 through the adaptor portion defining an interior side surface 32. Each adaptor portion also has a flange 34 extending radially beyond the exterior side surface 28.

The adaptor portions are adapted to capture the pulley therebetween when drawn axially together as will be explained more fully below. Particularly, the flange 34 of the adaptor portion 18a is adapted for making axially directed contact with the top face 20 of the pulley, and the flange of the adaptor portion 18b is adapted for making axially directed contact with the bottom face 22. An axially directed force between the adaptor portions and the pulley provides a frictional force on the faces of the pulley for causing the pulley to turn as a result of torque applied through the adaptor portions. Accordingly, the dimensions of the adaptor portions are selected so that the area of this contact is sufficiently large to distribute both forces safely within the material strength limits of the pulley.

In addition to being adapted to capture the pulley therebetween, the adaptor portions are adapted for attachment to the tapered bushing 16. Preferably, the adaptor portions are arranged so that drawing the adaptor portions together for capturing the pulley therebetween and attaching the adaptor portions to the bushing result from the same action. However, such duality of purpose is not essential to the invention.

As the exterior side surface 25 of the bushing is formed as the tapered surface of a frustrum, one or both of the interior side surfaces 32 of the adaptor portions may have a corresponding taper so that axially drawing the adaptor portion(s) and the bushing together produces a radially directed force as a result of wedging action. For example, as shown in FIGS. 1 and 2, the adaptor portion 18a has an interior side surface 32 that has a complementary taper to that of the bushing 16 and makes contact with the exterior side surface 25 thereof. However, the other adaptor portion 18b may or may not have a taper because it need not make contact with the bushing. Drawing the adaptor portion 18a toward the bushing captures the pulley between the adaptor portions 18a and 18b, and captures the adaptor portion 18b between the pulley and the bushing.

Engagement of the side surface 32 of the adaptor portion (s) and the side surface 25 of the bushing as a result of drawing the adaptor portion(s) and the bushing axially together wedges the adaptor portion(s) and bushing radially apart. The radially directed force provides a frictional force between the adaptor portion(s) and the bushing for transmitting the torque load from the shaft therethrough to the pulley.

Preferably, the exterior side surfaces 28 of both the adaptor portions 18a and 18b extend into the central aperture 21 of the pulley when capturing the pulley therebetween. Further, preferably, the exterior side surfaces 28 make contact with the interior side surface 23 of the pulley, as shown in FIGS. 1 and 2. These features provide for positively locating both adaptor portions with respect to the pulley, both during assembly and during use, providing enhanced structural integrity of the assembly, and assisting in the transmission of power by providing maximum surface area therefor. These features are particularly beneficial where the pulley 12 is a standard pulley having substantially parallel faces and an interior side surface 23 that is substantially perpendicular to the faces.

For drawing the adaptor portions and the bushing 16 together, a connecting member 34 is provided, which is preferably a threaded bolt 36. The flange 27 of the bushing includes apertures 40, and the adaptor portions include corresponding apertures 42 through the top and bottom faces, adapted to receive the bolt 36 therethrough. The apertures 42 may be threaded to receive the bolt 36, as shown in FIG. 2, or a separate nut may be provided for tightening the connecting member. Tightening the connecting member draws the adaptor portions and the bushing together, producing both the aforementioned axially directed and radially directed forces.

The adaptor portions are easily attached to the tapered bushing 16 and installed over the faces of the pulley 12, retaining the "quick disconnect" feature of the tapered bushing.

It is to be recognized that, while a particular adaptor for power transmission in a pulley and shaft according to the present invention has been shown as preferred, other configurations could be utilized, in addition to configurations already mentioned, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. An adaptor for removably connecting a pulley to a turning member, the pulley having two spaced, substantially parallel faces and an aperture through the pulley defining an interior side surface thereof extending substantially perpendicular to the faces, the adaptor comprising:

a first adaptor portion having an exterior side surface, a flange extending radially beyond said exterior side surface, and an aperture through said first adaptor portion for receiving a first portion of the turning member; and a second adaptor portion having an exterior side surface, a flange extending radially beyond said exterior side surface, and an aperture through said second adaptor portion for receiving a second portion of the turning member, wherein said flange of said first adaptor portion is adapted to make contact with one of the faces of the pulley, wherein said flange of said second adaptor portion is adapted to make contact with the other face of the pulley, wherein said exterior side surfaces of said first and said second adaptor portions are adapted to extend into the central aperture of the pulley substantially parallel to the interior side surface thereof.

2. The apparatus of claim 1, wherein said exterior side surfaces of said first and said second adaptor portions are adapted to make contact with the interior side surface of the pulley.

3. The apparatus of claim 1, wherein said turning member is a shaft having a bushing attached thereto, the bushing having a tapered exterior side surface, the pulley having two faces and an aperture through the pulley defining an internal side surface thereof, the adaptor further comprising an aperture through said first adaptor portion defining an interior side surface thereof, wherein said interior side surface has a taper complementary to the taper of the exterior surface of the bushing for receiving the shaft and at least part of the exterior side surface of the bushing.

4. The apparatus of claim 3, further comprising a connecting member adapted for drawing said first and said second adaptor portions together to capture the pulley between said flange of said first adaptor portion and said flange of said second adaptor portion.

5. The apparatus of claim 3, further comprising a connecting member adapted for drawing said first adaptor portion, said second adaptor portion and the bushing together to capture the pulley between said flange of said first adaptor portion and said flange of said second adaptor portion, and to capture said first adaptor portion between the pulley and the exterior side surface of the bushing.

6. The apparatus of claim 5, wherein the bushing has a flange extending radially beyond the exterior side surface thereof, and at least one aperture directed axially through the flange, wherein said first and said second adaptor portions include at least one corresponding aperture through said respective adaptor portions, wherein said connecting member is a threaded member adapted to extend through said at least one aperture through the flange and said at least one corresponding aperture through said respective adaptor portions.

7. An apparatus for transmitting power from a shaft, comprising:

a pulley having two faces and an aperture therethrough adapted for receiving a portion of the shaft and defining an interior surface of said pulley;

a first adaptor portion having an exterior side surface and a flange extending radially beyond said exterior side surface; and a second adaptor portion having an exterior side surface and a flange extending radially beyond said exterior side surface, wherein said flange of said first adaptor portion is disposed to lie substantially parallel to one of the faces of said pulley, wherein said flange of said second adaptor portion is disposed to lie substantially parallel to the other face of said pulley and wherein said exterior side surfaces are disposed to extend into said aperture and to lie substantially parallel to said interior surface.

8. The apparatus of claim 7, wherein the shaft has attached thereto a bushing having a tapered exterior side surface, wherein said first adaptor portion has an aperture therethrough defining an interior side surface having a taper that corresponds with and is complementary to the taper of the exterior side surface of the bushing, the apparatus further comprising a connecting member adapted to draw said first and said second adaptor portions together along the axis of the shaft, producing a radially directed force between said interior side surface of said first adaptor portion and the exterior side surface of the bushing.

9. The apparatus of claim 7, wherein said pulley is formed of plastic.

* * * * *